US012600003B2

(12) United States Patent
Yeh

(10) Patent No.: US 12,600,003 B2
(45) Date of Patent: Apr. 14, 2026

(54) KNIFE DETECTING AND SHARPENING SYSTEM

(71) Applicant: TEN SHEEG MACHINERY CO., LTD., Tainan City (TW)

(72) Inventor: Jason Yeh, Tainan City (TW)

(73) Assignee: Ten Sheeg Machinery Co., Ltd., Tainan City (TW)

( * ) Notice: Subject to any disclaimer, the term of this patent is extended or adjusted under 35 U.S.C. 154(b) by 388 days.

(21) Appl. No.: 18/348,467

(22) Filed: Jul. 7, 2023

(65) Prior Publication Data

US 2025/0010419 A1 Jan. 9, 2025

(51) Int. Cl.

| | |
|---|---|
| ***B24B 3/36*** | (2006.01) |
| ***B24B 3/56*** | (2006.01) |
| ***B24B 27/00*** | (2006.01) |
| ***B24B 49/10*** | (2006.01) |
| ***B24D 15/06*** | (2006.01) |
| ***B24D 15/08*** | (2006.01) |
| ***B26D 7/12*** | (2006.01) |

(52) U.S. Cl.
CPC ................ *B24B 3/36* (2013.01); *B24B 3/368* (2013.01); *B24B 3/56* (2013.01); *B24B 27/0076* (2013.01); *B24B 49/10* (2013.01); *B24D 15/065* (2013.01); *B24D 15/08* (2013.01); *B26D 7/12* (2013.01)

(58) Field of Classification Search
CPC ........... B24B 3/56; B24B 3/368; B24B 3/363; B24B 49/16; B26D 7/12; B26D 1/46
USPC .................................... 451/419, 420; 83/147
See application file for complete search history.

(56) References Cited

U.S. PATENT DOCUMENTS

| | | | | |
|---|---|---|---|---|
| 4,441,396 A | 4/1984 | Mercier et al. | | |
| 4,713,950 A | 12/1987 | Mascetti | | |
| 4,909,108 A | 3/1990 | Nakada et al. | | |
| 5,038,647 A * | 8/1991 | Biagiotti | .................. | B26D 1/54 83/458 |
| 9,227,288 B2 * | 1/2016 | Arndt | ....................... | B26D 7/12 |

(Continued)

FOREIGN PATENT DOCUMENTS

| | | |
|---|---|---|
| CN | 114030024 A | 2/2022 |
| DE | 2044540 A1 | 3/1972 |

(Continued)

OTHER PUBLICATIONS

DE-3815127-A1 English Translation (Year: 1989).*

*Primary Examiner* — Makena S Markman
(74) *Attorney, Agent, or Firm* — Rosenberg, Klein & Lee

(57) ABSTRACT

A knife detecting and sharpening system can be installed in a machine base of a splitting machine and adjacent to a band knife, which is an annular loop and is driven by two knife-driving wheels, and adjacent to a wheel shaft of one of the two knife-driving wheels. The system is controlled by a computer of the splitting machine and comprises a resistance detector, connected to the wheel shaft and electrically connected to the computer, and an electric sharpening device, which is mounted inside the machine base and is controlled by the computer to sharpen the band knife's blade, to be withdrawn from the band knife, and to automatically clean dust generated during sharpening the blade. The resistance detector detects a resistance during sharpening and transmits it to the computer, which can control the electric sharpening device operating a sharpening mode or a stop-sharpening mode based on the resistance.

2 Claims, 6 Drawing Sheets

(56) References Cited

U.S. PATENT DOCUMENTS

| | | | | |
|---|---|---|---|---|
| 2008/0087147 | A1* | 4/2008 | Sussmeier .............. | B26D 1/085 83/13 |
| 2013/0087029 | A1* | 4/2013 | Iyatani ................. | B26D 7/1863 83/13 |
| 2022/0379511 | A1* | 12/2022 | Girolami .................. | B26D 3/08 |

FOREIGN PATENT DOCUMENTS

| | | | | |
|---|---|---|---|---|
| DE | 3815127 | A1 * | 11/1989 | ............... B26D 7/12 |
| DE | 19858619 | C1 | 8/2000 | |
| DE | 10021614 | A1 | 11/2001 | |
| DE | 69901663 | T2 | 9/2002 | |
| EP | 0781632 | A1 | 7/1997 | |
| JP | 2009154250 | A | 7/2009 | |
| JP | 6762021 | B1 | 9/2020 | |
| TW | 113650 | U | 5/1989 | |
| TW | 384774 | U | 3/2000 | |
| TW | 200837197 | A | 9/2008 | |

* cited by examiner

KNIFE DETECTING AND SHARPENING SYSTEM

BACKGROUND OF THE INVENTION

1. Field of the Invention

The present invention relates to a technical field of splitting machines, specifically to a knife detecting and sharpening system installed in a splitting machine that can automatically detect cutting resistance of an annular band knife, is used to split materials, and can automatically sharpen the band knife.

2. Description of Related Art

A splitting machine is used to split or cut material sheets such as plastic, rubber, etc., into base materials with preset thicknesses. A machine base of the splitting machine has two knife-driving wheels respectively mounted at a left side and a right side of the machine base. An annular band knife wraps around the two knife-driving wheels. One of the two knife-driving wheels is connected to a driving motor. While the splitting machine operates, the annular band knife is driven by the two knife-driving wheels. After the material sheets such as plastic, rubber, etc., are fed to a splitting area of the machine base of the splitting machine by a feeding mechanism, the material sheets are split to the base materials having preset thicknesses and are output.

While the splitting machine splits the material sheets to the base material having preset thicknesses, it occurs often that the band knife is worn out due to continuous splitting. The band knife is blunt through wear, increasing a resistance of the band knife when splitting the material sheets, and hence a process of the band knife splitting the material plates goes arduously. Therefore, in a splitting machine nowadays, two sharpening mechanisms are mounted in the machine base. When the band knife is worn out and blunt, an operator manually operates the sharpening mechanisms to sharpen a blade of the band knife.

However, the sharpening mechanisms of the splitting machine are operated manually by the operator, thus when to sharpen the blade and the state of sharpening are determined by the operator by experiences, such that a process of sharpening is time-consuming and labor-intensive. In addition, while a sharpening wheel of the sharpening mechanism sharpens the band knife, a sharpening capability of the sharpening wheel may be affected by dust remaining on a surface of the sharpening wheel after sharpening, and thus the process of sharpening is inefficient.

SUMMARY OF THE INVENTION

The objective of the present invention is to provide a knife detecting and sharpening system to resolve a drawback of a splitting machine nowadays relying on manually operated sharpening mechanisms to sharpen an annular band knife, which is inconvenient.

The knife detecting and sharpening system is configured to be installed in a machine base of a splitting machine and adjacent to a band knife, which is an annular loop and is driven by two knife-driving wheels, and the knife detecting and sharpening system is adjacent to a wheel shaft of one of the two knife-driving wheels. The knife detecting and sharpening system is controlled by a computer of the splitting machine and comprises a resistance detector and an electric sharpening device. The resistance detector is connected to the wheel shaft of said one of the two knife-driving wheels and is electrically connected to the computer. The resistance detector automatically, and continuously or intermittently detects a torque of said driven knife-driving wheel and transmits a magnitude of the torque to the computer. So, the computer can determine whether the magnitude of the torque is greater than a default value or not, thereby deciding to operate a stop-sharpening mode or to switch to a sharpening mode. The electric sharpening device is mounted in the machine base of the splitting machine and comprises one or two electric sharpening modules controlled by the computer. The one or two electric sharpening modules are able to sharpen a blade of the band knife, to be withdrawn from the band knife, and to automatically clean dust generated after the band knife is sharpened.

By a whole design of the knife detecting and sharpening system of a splitting machine, while the splitting machine splits material sheets such as plastic, rubber, etc., into base materials with preset thicknesses, the computer automatically, and continuously or intermittently detects whether the band knife is sharp or not in cooperation with the resistance detector. If the band knife is blunt through wear, a splitting resistance will increase, making a process of the band knife splitting the material plates arduous. In the meantime, the computer will determine that the magnitude of the splitting resistance received from the resistance detector is greater than a default value. So, the computer controls the electric sharpening device to automatically sharpen the blade of the band knife and to automatically clean dust generated while the band knife is sharpened; meanwhile, the computer determines whether the band knife is sharp or not in cooperation with the resistance detector. If the computer determines that the magnitude of the splitting resistance received from the resistance detector is less than the default value, the computer will control the electric sharpening device to stop sharpening the blade of the band knife and to withdraw from the band knife. Therefore, the knife detecting and sharpening system that the present invention provides is a type of system which can automatically detect and sharpen the band knife to resolve the drawback of the splitting machine nowadays that manually operating the sharpening mechanisms to sharpen the annular band knife is inconvenient.

DETAILED DESCRIPTION OF THE PREFERRED EMBODIMENT

Figure 1:
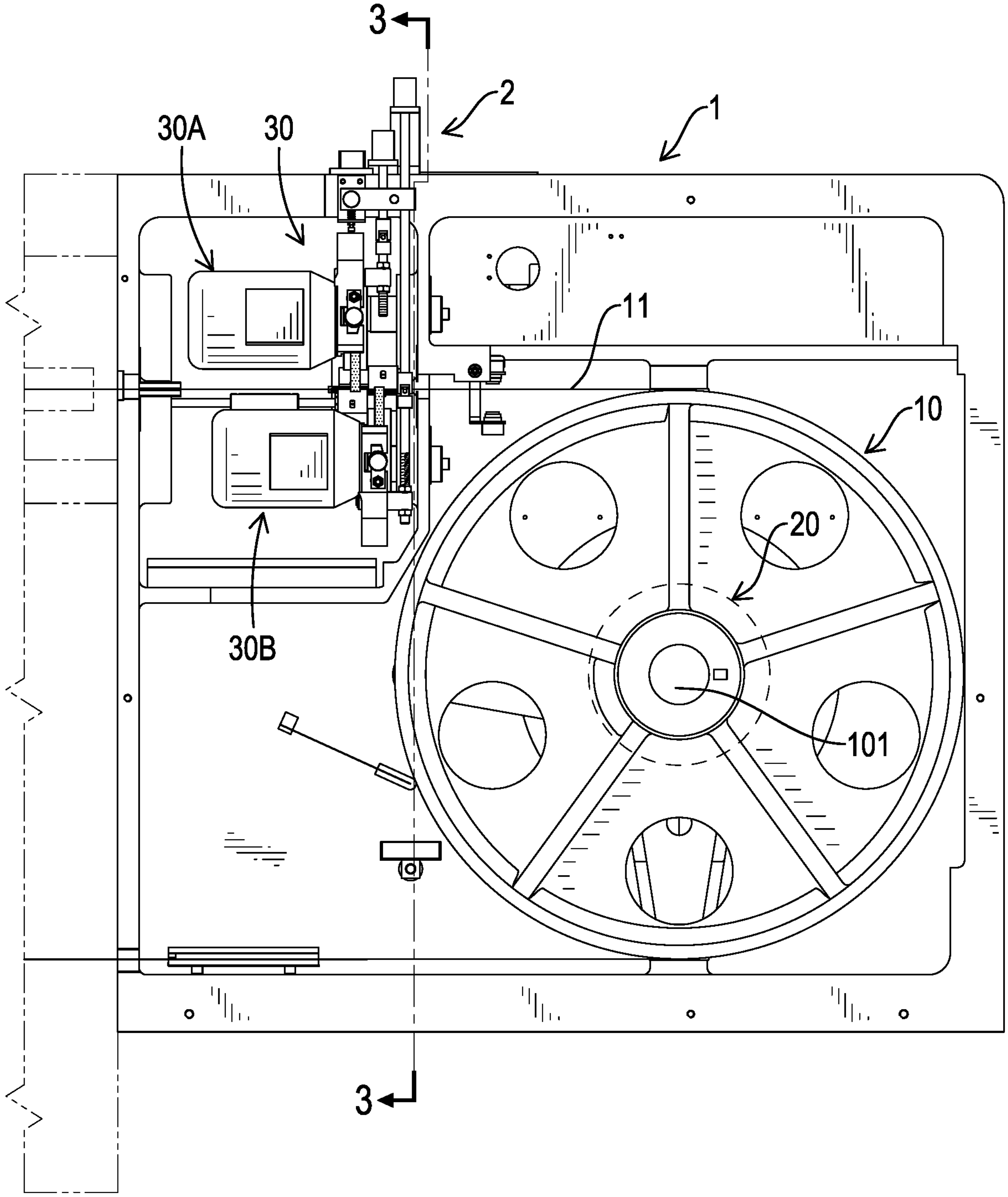
FIG. 1 is a partial front view of an embodiment of a knife detecting and sharpening system of a splitting machine in accordance with the present invention, applied to a splitting machine.
Figure 2:
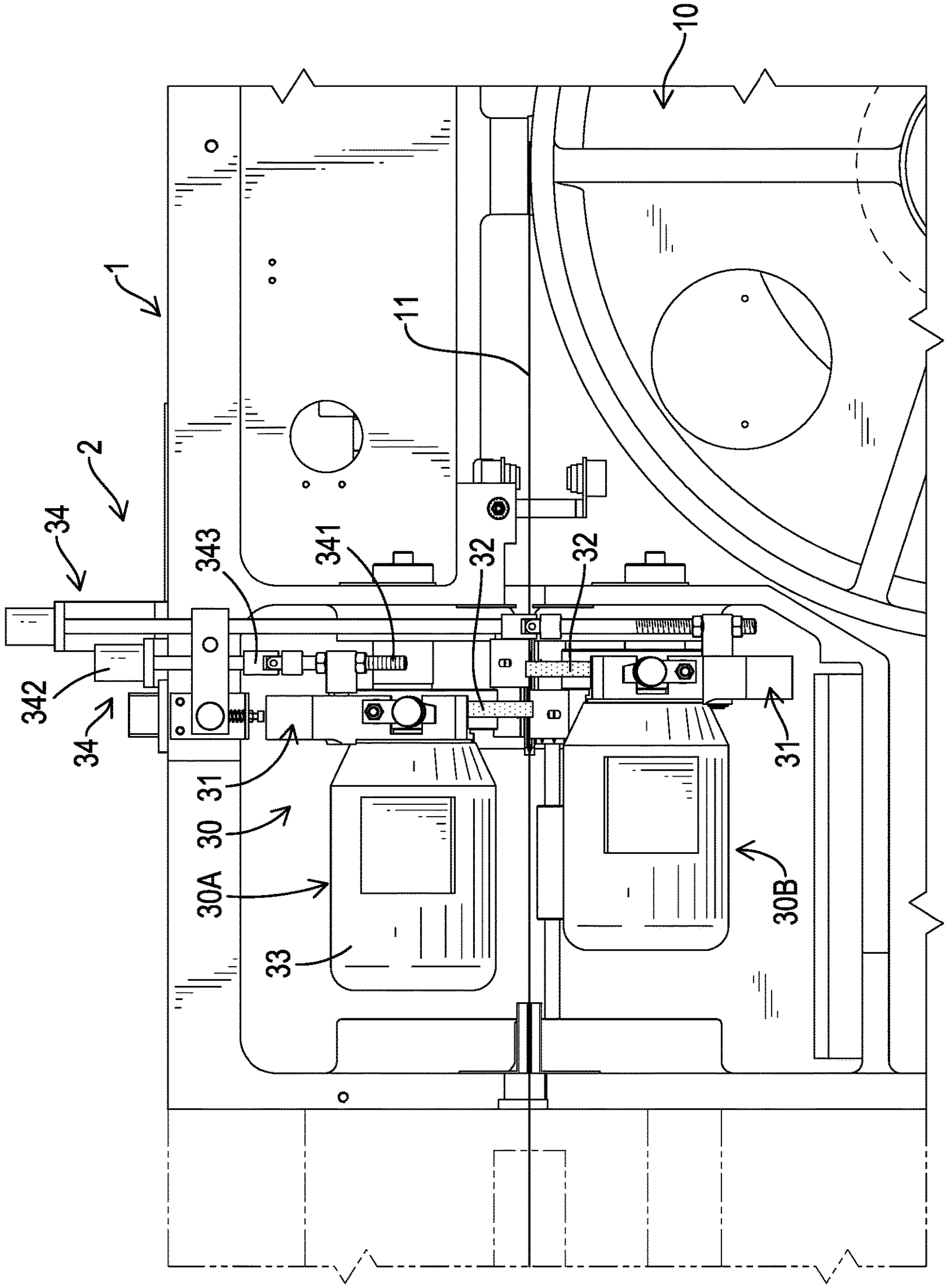
FIG. 2 is a partial enlarged view of FIG. 1.
Figure 3:
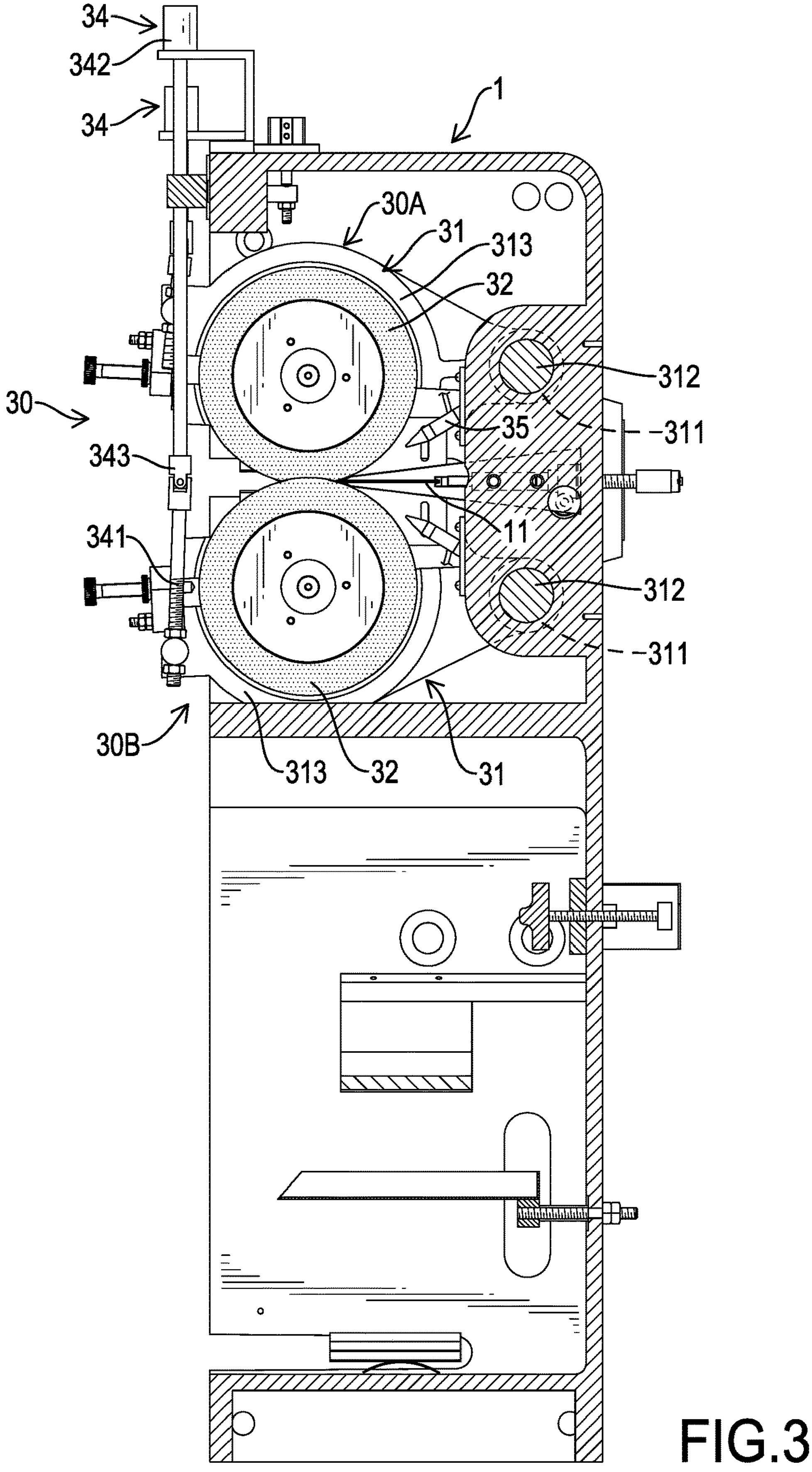
FIG. 3 is a partial sectional side view across line 3-3 in FIG. 1.

With reference to FIGS. 1 and 3, an embodiment of a knife detecting and sharpening system 2 configured to be installed in a splitting machine is shown. The system can be mounted in a machine base 1 of the splitting machine and is adjacent to a band knife, which is an annular loop and is driven by two knife-driving wheels 10, and the system is adjacent to a wheel shaft 101 of one of the two knife-driving wheels 10. The knife detecting and sharpening system 2 is controlled by a computer of the splitting machine and comprises a resistance detector 20 and an electric sharpening device 30.

As shown in FIG. 1, the resistance detector 20 is mounted in the splitting machine, is connected to the wheel shaft 101 of said one of the two knife-driving wheels 10, and is electrically connected to the computer. The resistance detector 20 automatically, and continuously or intermittently detects a torque of the said driven knife-driving wheel 10 and transmits a magnitude of the torque to the computer. So, the computer can determine whether the magnitude of the torque is greater than a default value or not, thereby deciding to stop or to switch to a sharpening mode. A torque detector can be chosen as the resistance detector 20, and the torque detector is a known product nowadays, so its specific configurations and torque-detecting methods will be omitted.

As shown in FIGS. 1 to 4, the electric sharpening device 30 comprises one or two electric sharpening modules 30A, 30B. The one or two electric sharpening modules 30A, 30B are controlled by the computer and are able to sharpen a side, which has a blade, of the annular band knife. The one or two electric sharpening modules 30A, 30B can automatically clean dust generated while the band knife is sharpened. In the embodiment, the amount of the one or two electric sharpening modules 30A, 30B of the electric sharpening device 30 is two. The two electric sharpening modules 30A, 30B are respectively configured to sharpen two sides of the blade of the annular band knife.

As shown in FIGS. 1 to 4, the one or two electric sharpening modules 30A, 30B comprise a knife base 31, a sharpening wheel 32, a sharpening-wheel motor 33, a wheel-feeding assembly 34 and a cleaning assembly 35. The knife base 31 has a wheel-connecting portion 313 and a pivotally-connecting end 311 disposed at an end of the wheel-connecting portion 313. The knife base 31 is pivotally connected to the machine base 1 through the pivotally-connecting end 311 combined with a pivotal rod 312. The sharpening wheel 32 is rotatably mounted at the wheel-connecting portion 313 of the knife base 31. The sharpening-wheel motor 33 is mounted at a side of the wheel-connecting portion 313 of the knife base 31, is connected to the sharpening wheel 32, and is controlled by the computer. The wheel-feeding assembly 34 is mounted at the machine base 1 and is connected to the wheel-connecting portion 313 of the knife base 31. The wheel-feeding assembly 34 is controlled by the computer to drive the knife base 31 to rotate on the pivotal rod 312. Driven by the wheel-feeding assembly 34, the knife base 31 rotates to let the sharpening wheel 32 contact the side, which has the blade, of the band knife and to withdraw the sharpening wheel 32 from the band knife. In the embodiment, the two electric sharpening modules 30A, 30B are spaced apart from each other.

As shown in FIGS. 1 to 4, the wheel-feeding assembly 34 comprises a screw rod 341 and a servomotor 342. One end of the screw rod 341 is threaded and connected to the wheel-connecting portion 313, and another end of the screw rod 341 is connected to a motor shaft of the servomotor 342 through a universal coupling 343. Therefore, the wheel-feeding assembly 34 is controlled by the computer to drive the sharpening wheel 32 in the knife base 31 to contact the blade of the band knife (which means feeding the sharpening wheel 32) and to withdraw the sharpening wheel 32 from the band knife (which means moving the sharpening wheel 32 away from the band knife). By the servomotor 342, controlled by the computer, combined with the screw rod 341 to connect to the knife base 31, which is rotatable in the machine base 1, a state of the sharpening wheel 32 contacting the band knife can be altered, therefore to control sharpening degrees applied on the band knife. The wheel-feeding assembly 34 can be replaced with any other equivalent driving assembly.

Figure 4:
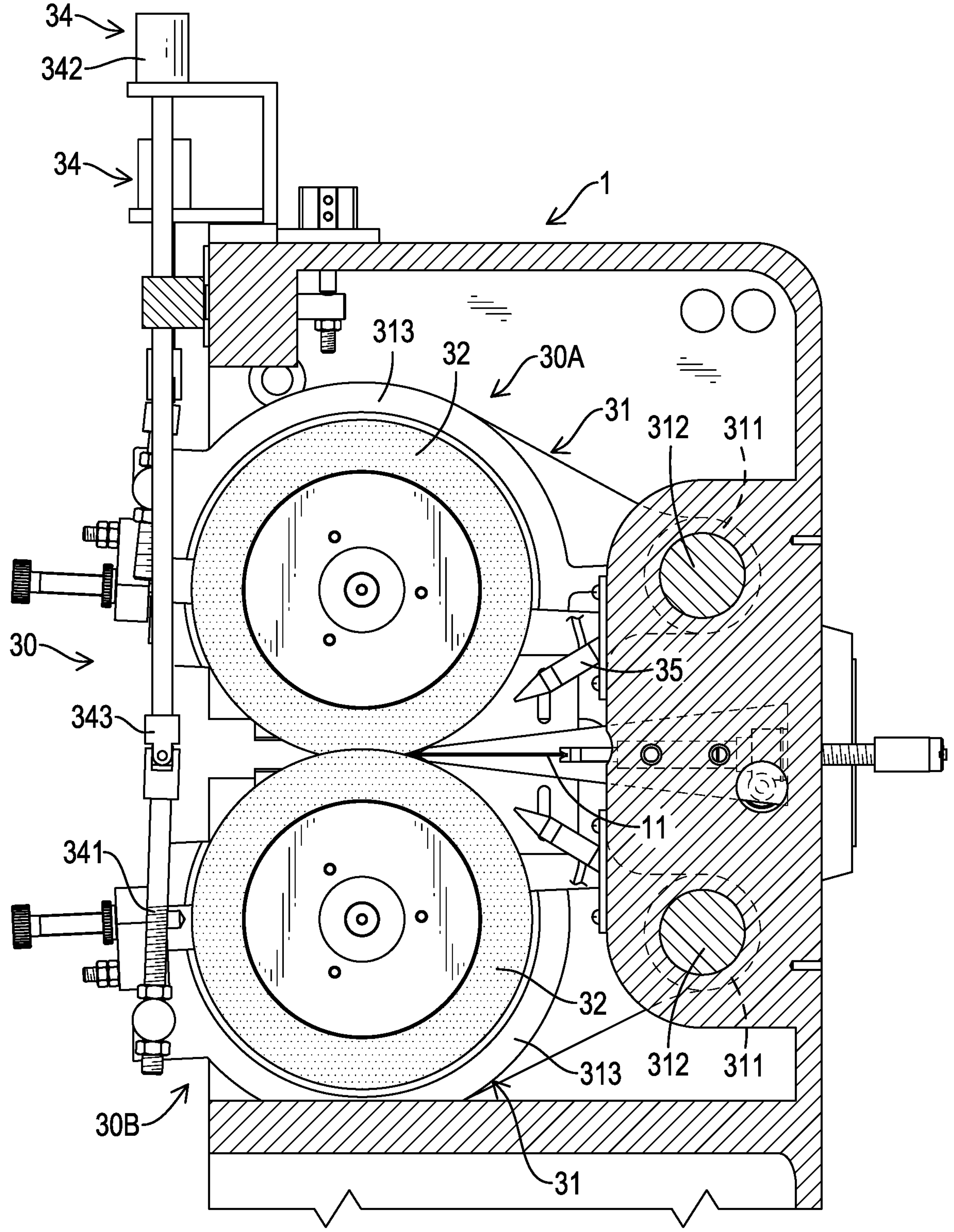
FIG. 4 is a partial enlarged view of FIG. 3.
Figure 5:
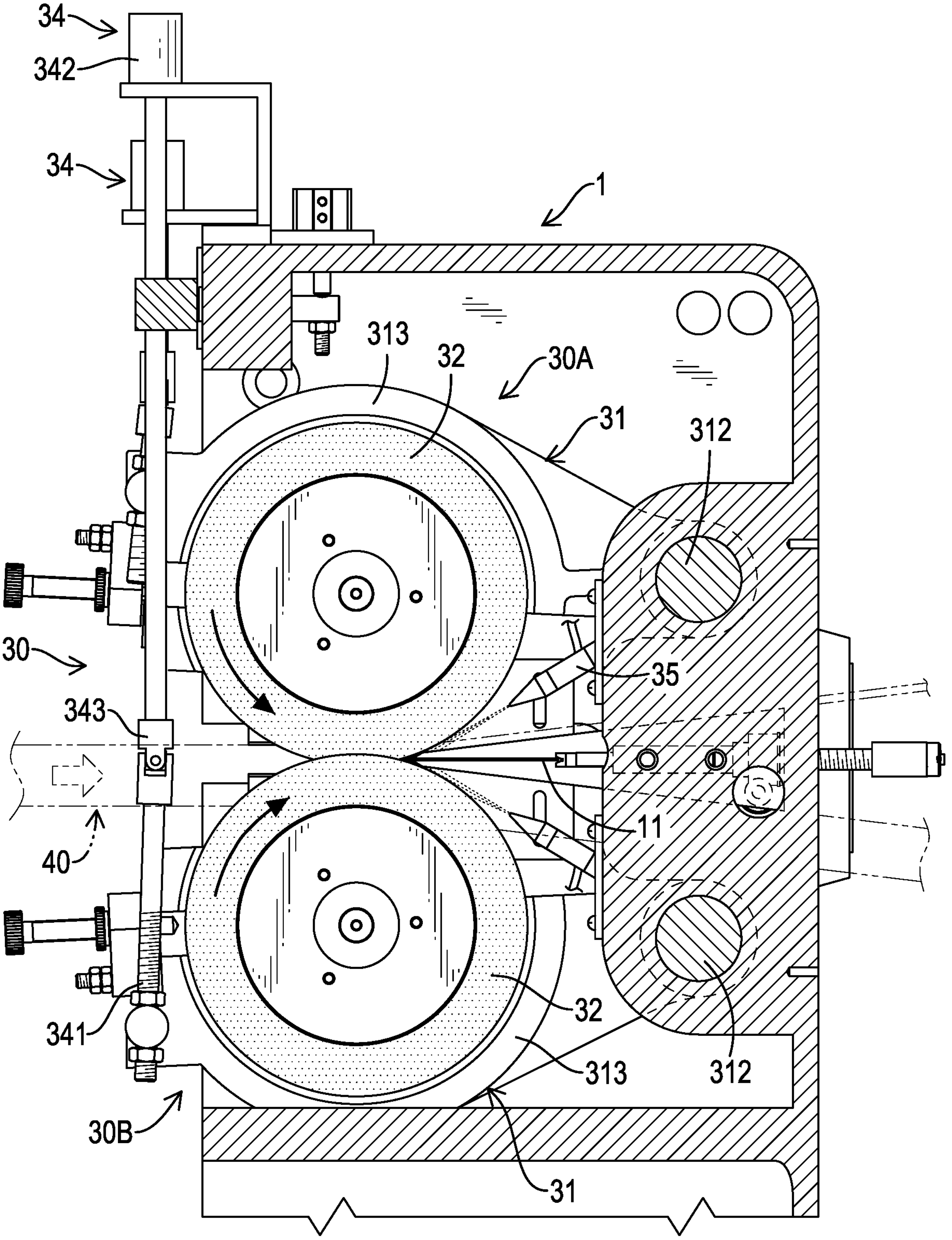
FIG. 5 is a first operational view of the embodiment of the knife detecting and sharpening system of a splitting machine in accordance with the present invention, applied to the splitting machine shown in FIGS. 1 and 3.
Figure 6:
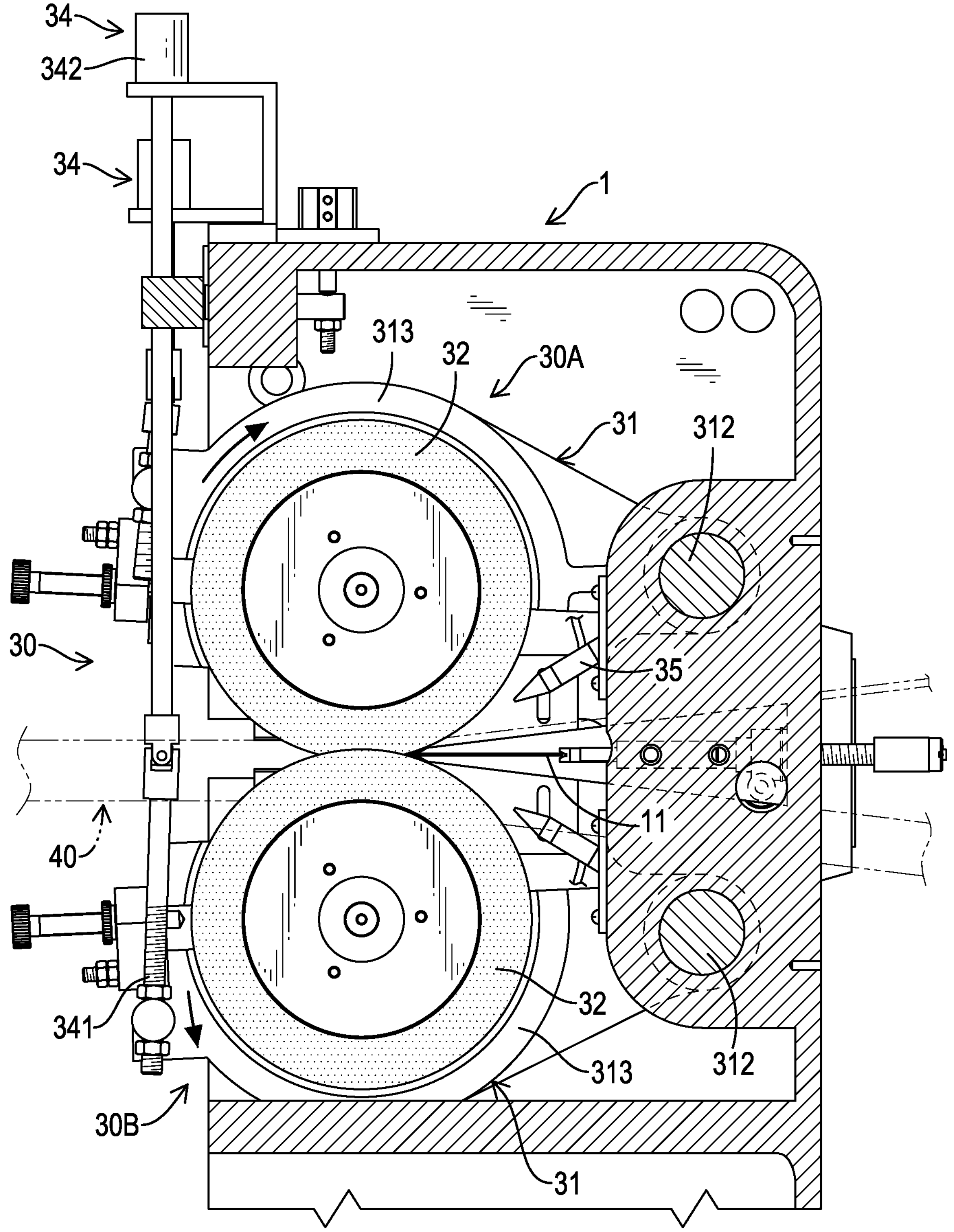
FIG. 6 is a second operational view of the embodiment of the knife detecting and sharpening system of a splitting machine in accordance with the present invention, applied to the splitting machine shown in FIGS. 1 and 3.

As shown in FIG. 4, the cleaning assembly 35 is mounted at the machine base 1 and connected to an exterior fluid source. The exterior fluid source provides fluid such as gas, air, etc., or liquid, such as water, etc. The cleaning assembly 35 is controlled by the computer to spurt pressurized fluid toward the sharpening wheel 32. By cleaning the dust remaining at a surface of the sharpening wheel 32 while sharpening the band knife, a sharpening capability of the sharpening wheel 32 is maintained.

An application of the knife detecting and sharpening system 2 in the splitting machine is shown in FIGS. 1, 2, 5 and 6. While the splitting machine is operating, the annular band knife 11 is driven by the two knife-driving wheels 10. When after material sheets 40 such as plastic, rubber, etc., are fed to a splitting area of the splitting machine by a feeding mechanism, the material sheets 40 are split into base materials having preset thicknesses and are output.

While the splitting machine splits the material sheets 40 to the base materials having preset thicknesses, the band knife 11 is worn out due to continuous splitting. Cooperating with the resistance detector 20 of the knife detecting and sharpening system 2, the computer continuously or intermittently detects whether the band knife 11 is sharp or not. Because the band knife 11 will be blunt through wear, it increases splitting resistance and makes a process of the band knife 11 splitting the material plates 40 arduous. The resistance detector 20 will detect the splitting resistance while the band knife 11 is splitting the material plates 40 and transmit a magnitude of the splitting resistance to the computer. If the computer determines that the magnitude of the splitting resistance received from the resistance detector 20 is greater than a default value, the computer will control the electric sharpening device 30 to automatically feed the sharpening wheel 32 to sharpen the blade of the band knife 11. At the same time, the computer controls the cleaning assembly 35 to spurt the pressurized fluid toward the sharpening wheel 32 to clean the dust remaining on the surface of the sharpening wheel 32, therefore maintaining the sharpening capability of the sharpening wheel 32.

In addition, the two electric sharpening modules 30A, 30B of the electric sharpening device 30 are respectively controlled by the computer, and thus the servomotor 342 can drive the screw rod 341 spinning to drive the sharpening wheel 32 in the knife base 31 to contact the blade of the band knife 11. In the meantime, driven by the sharpening-wheel motor 33 controlled by the computer, the sharpening wheel 32 sharpens the band knife 11, and the cleaning assembly 35 cleans the dust remaining on the surface of the sharpening wheel 32. While the electric sharpening device 30 is sharpening the blade of the band knife 11, the computer detects whether the band knife 11 is sharp or not in cooperation with the resistance detector 20. If the computer determines that the magnitude of the splitting resistance received from the resistance detector 20 is less than the default value, the computer will switch to the stop-sharpening mode. The computer will control the electric sharpening device 30 to automatically stop sharpening the blade of the band knife 11 and withdraw from the band knife 11, and control the cleaning assembly 35 to stop spurting the pressurized fluid. Therefore, the knife detecting and sharpening system 2 of the present invention is a type of system which can automatically detect and sharpen the band knife 11 to resolve a drawback that a splitting machine nowadays relying on manually operated sharpening mechanisms to sharpen an annular band knife 11 is inconvenient.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the board general meaning of the terms in which the appended claims are expressed.

What is claimed is:

1. A knife detecting and sharpening system configured to be installed in a machine base of a splitting machine and being adjacent to a band knife, which is an annular loop and is driven by two knife-driving wheels, and the knife detecting and sharpening system adjacent to a wheel shaft of one of the two knife-driving wheels; the knife detecting and sharpening system controlled by a computer of the splitting machine and comprising:

a resistance detector connected to the wheel shaft of said one of the two knife-driving wheels and electrically connected to the computer; the resistance detector automatically, and continuously or intermittently detecting a torque of said driven knife-driving wheel, and transmitting a magnitude of the torque to the computer so that the computer determines whether the amount of the torque is greater than a default value, thereby deciding to operate a stop-sharpening mode or to switch to a sharpening mode; and an electric sharpening device mounted in the machine base of the splitting machine and comprising two electric sharpening modules controlled by the computer to sharpen a blade of the band knife, to be withdrawn from the band knife, and to automatically clean dust generated after the band knife is sharpened; the two electric sharpening modules respectively configured to sharpen two sides of the blade of the band knife; each one of the two electric sharpening modules comprising a knife base having a wheel-connecting portion; and a pivotally-connecting end disposed at an end of the wheel-connecting portion; the knife base pivotally connected to the machine base through the pivotally-connecting end combined with a pivotal rod;

a sharpening wheel rotatably mounted at the wheel-connecting portion of the knife base;

a sharpening-wheel motor mounted at a side of the wheel-connecting portion of the knife base and connected to the sharpening wheel, and the sharpening-wheel motor controlled by the computer;

a wheel-feeding assembly mounted at the machine base and connected to the wheel-connecting portion of the knife base; the wheel-feeding assembly controlled by the computer to drive the knife base to rotate on the pivotal rod; the knife base rotated to let the sharpening wheel contact a side, which has the blade, of the band knife and to withdraw the sharpening wheel from the band knife;

a cleaning assembly mounted at the machine base and connected to an exterior fluid source; the cleaning assembly controlled by the computer to spurt pressurized fluid toward the sharpening wheel to clean the dust remaining at a surface of the sharpening wheel.

2. The knife detecting and sharpening system as claimed in claim 1, wherein the wheel-feeding assembly comprises a screw rod, one end of the screw rod threaded and connected to the wheel-connecting portion; and a servomotor mounted at the machine base and controlled by the computer; another end of the screw rod connected to a motor shaft of the servomotor, thereby controlling the wheel-feeding assembly to drive the sharpening wheel in the knife base to contact the blade of the band knife and to be withdrawn from the band knife.

* * * * *